Nov. 12, 1963     A. J. H. SALE     3,110,794
WAVE GUIDE APPARATUS AND ITS USE

Filed May 2, 1960     2 Sheets-Sheet 1

INVENTOR
Anthony John Hanson Sale
by Brumbaugh, Free, Graves & Donohue,
Attorneys.

INVENTOR
Anthony John Hanson Sale
by Brumbaugh, Free, Graves & Donohue,
Attorneys.

United States Patent Office 3,110,794
Patented Nov. 12, 1963

3,110,794
WAVE GUIDE APPARATUS AND ITS USE
Anthony John Hanson Sale, Sharnbrook, Bedford, England, assignor to Lever Brothers Company, New York, N.Y., a corporation of Maine
Filed May 2, 1960, Ser. No. 26,186
Claims priority, application Great Britain May 7, 1959
9 Claims. (Cl. 219—10.55)

This invention relates to wave guide apparatus and its use, and particularly to wave guide apparatus for the transmission of microwaves.

Such wave guides terminate in a mouthpiece, which may be the end of the wave guide proper or may be a flare designed to redistribute the field of wave radiation, as for example, when the microwaves are to be fed to material over a surface area of the material which is larger than that of the wave guide's transverse section. However, the distribution of the microwave energy (corresponding to electric field intensity) at the mouthpiece's aperture is far from uniform: thus with a rectangular wave guide ("rectangular" being a term we use to include both oblong and square) operating at the preferred (fundamental) mode, the energy per unit area is greatest at the central portion of the mouthpiece aperture and decreases continuously until it is effectively zero at the aperture's extremities. Such very uneven distribution is undesirable, especially when the microswaves are to be used in the treatment of foods.

In the microwave wave guide mouthpiece of this invention, the edges defining the mouthpiece aperture are shaped so as to improve the uniformity of microwave distribution.

In one form of mouthpiece the edges referred to derive their shape from corrugation of the corresponding wall portions of the mouthpiece.

In another form of mouthpiece the edges are formed by lips which extend transversely to the corresponding wall portions of the mouthpiece.

A further form of mouthpiece according to the invention has its wall portions carrying a series of elements which extend or are movable transversely to the wall portions to define non-continuously edges shaped as described above.

How the invention can be performed will now be described with reference to the accompanying drawings, in which.

Figure 1:
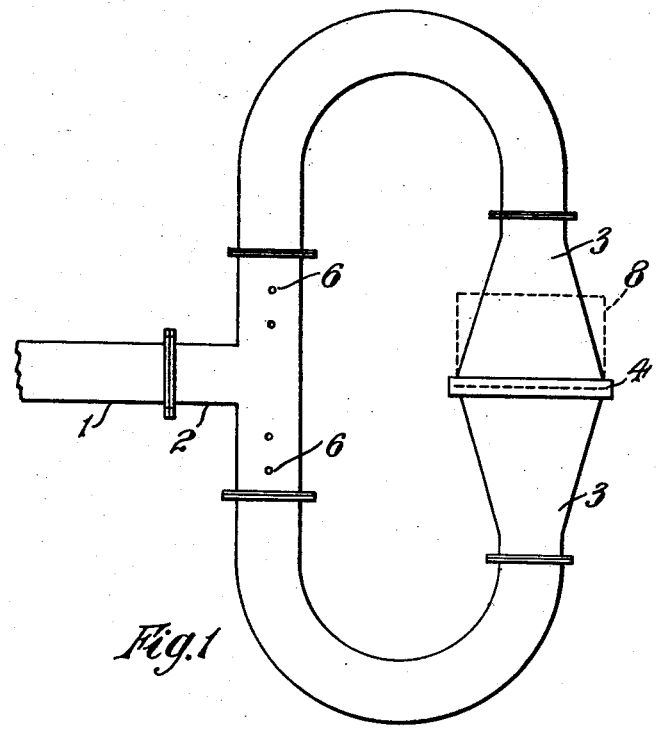
FIG. 1 is a side-elevation of apparatus for transmitting microwaves to a layer of material to be heated thereby.

The apparatus shown in FIG. 1 comprises a wave guide 1 of oblong section coupled to a magnetron (not shown) for generating microwaves. At the T-junction 2 the wave guide is branched into two identical U-shaped limbs, each of which terminates in a flare 3. A conveyor belt 4 permeable to microwaves passes between the two flares, parallel to the planes of the elongated apertures 3a (FIG. 2) of the flares, through which apertures microwaves can be fed to a layer of material supported on the belt 4. The belt is enclosed by a channel 7 made of the same material as that of the wave guides and flares, and this channel is secured to the flares 3. The channel reduces loss of microwave energy such as would occur by scattering and radiation in the vicinity of the flares, and it includes chokes 8 near its ends to prevent escape of microwaves therefrom.

The T-junction 2 (FIG. 1) includes screws 6 which are adjustable to match the impedance of the U-shaped limbs to that of the wave guide 1.

Figure 3:
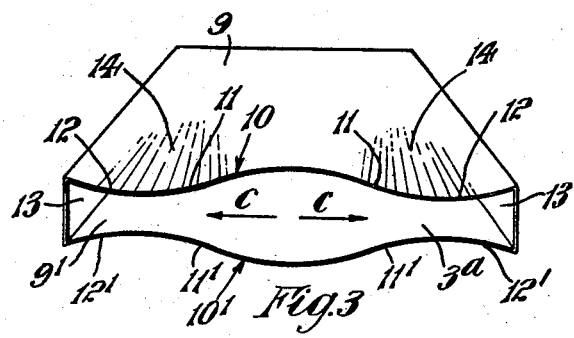
FIG. 3 is a perspective view of one form of flare according to the invention.

The flare 3 shown in FIG. 3 has an elongated aperture 3a defined by the opposed edges 10 and 10'. These edges are shaped so as to approach one another, as at 11 and 11', in passing (as indicated by arrows CC) from the central portion of the flare aperture 3a, towards the opposite extremities 13 of the aperture. The edges subsequently recede from one another, as at 12 and 12'. In the form of flare shown in FIG. 3, the edges 10 and 10' of the aperture 3a derive their shape from corrugations such as 14 in the corresponding elongated wall portions 9 and 9' of the flare.

Figure 4:
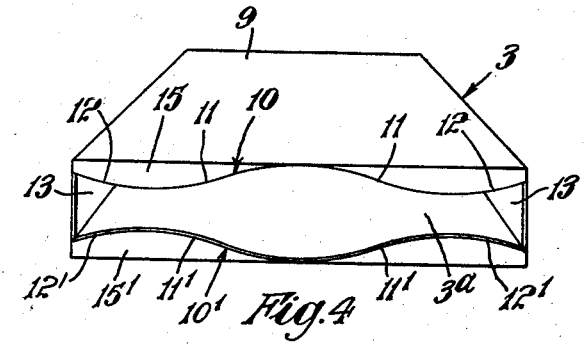
FIG. 4 is a perspective view of another form of flare.

In the form of flare shown in FIG. 4, the edges 10 and 10' of the aperture 3a are formed by lips 15 and 15' of electrically conductive material, which extend transversely to the corresponding flare wall portions 9 and 9'. These lips can be integral with the wall portions 9 and 9', or can be detachable therefrom.

Figure 5:
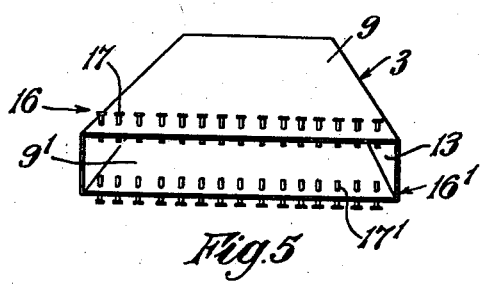
FIG. 5 is a perspective view of a further form of flare.

In the form of flare shown in FIG. 5 the opposed elongated wall portions 9 and 9' each carry a series, 16 and 16' of movable electrically conductive elements, which here take the form of threaded screws 17 and 17' co-operating with threaded holes in wall portion 9 and 9'. The members 17 and 17' of series 16 and 16' respectively are adjustable towards and away from one another to define non-continuously, as indicated diagrammatically in FIG. 6, the contours of edges shaped similarly to those in FIGS. 3 and 4.

Suitable mouthpiece dimensions for such a flare for use with a wave guide of transverse section 7.2 x 3.4 cm. transmitting microwaves of wavelength 10 cm., are 16.5 x 3.4 cm. There may suitably be fifteen brass screws of length 2.54 cm. and diameter 0.36 cm., evenly spaced in each series.

Figure 2:
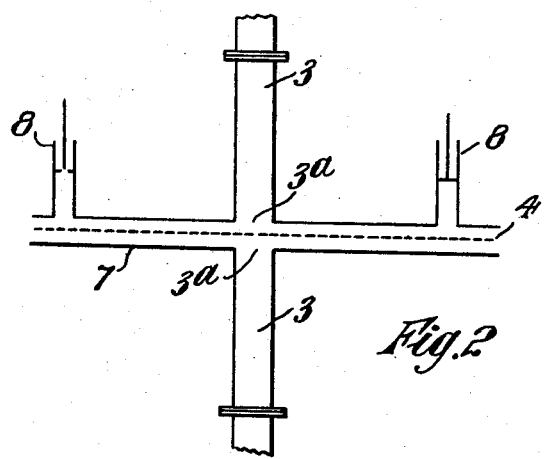
FIG. 2 is a front-elevation of part of the apparatus shown in FIG. 1.
Figure 6:
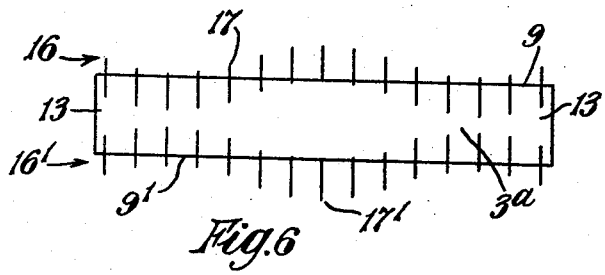
FIG. 6 is a diagram illustrating adjustment of the members of the flare shown in FIG. 5.

Twin flares having these dimensions and having their elements adjusted as shown in FIG. 6 were used in apparatus of the type illustrated in FIGS. 1 and 2 to heat-treat sliced ham to increase its storage life.

Slices (11.4 x 11.4 cm.) of ham (total weight 115 grams) packed in vacuo in microwave-permeable plastic packs were passed by means of the conveyor belt 4 at a uniform rate through the channel 7 between the flares. Each pack was exposed for a total period of 1 minute to the microwaves (10 cm. wavelength, generated by a 500 watt magnetron power unit) issuing from the flare apertures and during this period the temperature of the ham rose from 20° C. to a final temperature of about 75° C. Measurement of the final temperature of the ham by means of thermo-couple elements in the direction of the arrows CC in FIG. 3 (that is parallel to the plane of the belt and transverse to the direction of motion) gave a value of 75±5° C.; this was far more uniform than when ordinary flares were employed.

After removal from the conveyor belt, the packets were cooled in ice water.

When a 2-kilowatt magnetron was used, the rate of passage of the ham could be increased to one packet every 15 seconds to obtain equivalent heating and hence equivalent increase in storage life.

Although the embodiments of the invention specifically described are wave guide flares, it will be appreciated that the invention can be applied to the mouthpiece of a wave guide itself to improve the uniformity of microwave distribution there.

Moreover, it is to be understood that the particular shapes described for the edges of the mouthpiece aperture have been given for illustration only. In different circumstances, as when the wave guide is not an oblong one or when the wave guide is operated at a mode other than the fundamental, the shapes given to the mouthpiece aperture edges may require to be varied to give a desired degree of uniformity in heating, corresponding to an improved uniformity of microwave energy distribution.

What is claimed is:

1. A microwave wave guide mouthpiece having an axis and having a rectangular cross-sectional shape at the rear end thereof, and means modifying forwardly of said end the shape of the cross-sectional area in said mouthpiece which is axially transmissive of microwaves so as to define at the mouthpiece outlet an aperture for microwaves which departs from said rectangular shape in the cross-sectional shape thereof, the outline effective for microwaves of said aperture being characterized by four edges of which an opposing pair of longitudinally extending edges are shaped so as to improve the uniformity of microwave distribution, the shaping of said pair of edges being such that, in passing from the central portion of the mouthpiece aperture towards the opposite extremities, said opposing edges approach one another.

2. A microwave wave guide mouthpiece as claimed in claim 1 in which, of said opposing pair of edges, each is defined, noncontinuously, by a series of longitudinally spaced electrically conductive elements extending transversely of a corresponding wall portion of said mouthpiece and projecting from said wall portion inwardly towards the other edge.

3. A mouthpiece according to claim 1, wherein said edges derive their shape from corrugation of the corresponding wall portions of the mouthpiece.

4. A mouthpiece according to claim 1, wherein said edges are formed by electrically conductive lips which extend transversely to the corresponding wall portions of the mouthpiece.

5. A microwave wave guide mouthpiece having an axis and having a rectangular cross-sectional shape at the rear end thereof, and means modifying forwardly of said end the shape of the cross-sectional area in said mouthpiece which is axially transmissive of microwaves so as to define at the mouthpiece outlet an aperture for microwaves which departs from said rectangular shape in the cross-sectional shape thereof, the outline effective for microwaves of said aperture being characterized by four edges of which an opposing pair of longitudinally extending edges are shaped so as to improve the uniformity of microwave distribution, the shaping of said pair of edges being such that, in passing from the central portion of the mouthpiece aperture towards the opposite extremities, said opposing edges first approach one another and then recede from one another.

6. A microwave wave guide mouthpiece as claimed in claim 5 in which said opposing pair of said edges derive their shape from corrugations of the corresponding wall portions of the mouthpiece.

7. A microwave wave guide mouthpiece as claimed in claim 5 in which said opposing pair of said edges are formed by electrically conductive lips which extend transversely to the corresponding wall portions of the mouthpiece.

8. A microwave wave guide mouthpiece as claimed in claim 5 in which said opposing pair of said edges are each defined, noncontinuously, by a series of longitudinally spaced electrically conductive elements extending transversely of a corresponding wall portion of said mouthpiece and projecting from said wall portion inwardly towards the other edge.

9. A microwave wave guide mouthpiece, of rectangular cross-section, in which a pair of its opposed wall portions carry, at the outlet, a series of electrically conductive elements which extend transversely to those wall portions and which are movable towards and away from positions in which they define, noncontinuously, a pair of opposed edges which are shaped so as to improve the uniformity of microwave distribution, the shaping of said edges being such that in passing from the central portion of the mouthpiece aperture towards the opposite extremities thereof, said edges approach one another.

References Cited in the file of this patent

UNITED STATES PATENTS

| 2,574,433 | Clapp | Nov. 6, 1951 |
| 2,581,352 | Bliss | Jan. 8, 1952 |
| 2,650,985 | Rust et al. | Sept. 1, 1953 |
| 2,743,440 | Riblet | Apr. 24, 1956 |

FOREIGN PATENTS

| 715,957 | Great Britain | Sept. 22, 1959 |